US008914767B2

(12) United States Patent
Savant et al.

(10) Patent No.: US 8,914,767 B2
(45) Date of Patent: Dec. 16, 2014

(54) SYSTEMS AND METHODS FOR USING QUICK RESPONSE CODES TO ACTIVATE SOFTWARE APPLICATIONS

(75) Inventors: Anubhav Savant, Culver City, CA (US); Gaurav Chandna, Redondo Beach, CA (US); Garret Polk, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 211 days.

(21) Appl. No.: 13/418,336

(22) Filed: Mar. 12, 2012

(65) Prior Publication Data
US 2013/0239104 A1    Sep. 12, 2013

(51) Int. Cl.
*G06F 9/44*    (2006.01)

(52) U.S. Cl.
USPC ........... 717/100; 717/102; 717/120; 713/166; 713/171; 713/172

(58) Field of Classification Search
CPC ........................................................ G06F 8/60
See application file for complete search history.

(56) References Cited

U.S. PATENT DOCUMENTS

| | | | | | |
|---|---|---|---|---|---|
| 5,175,814 | A | * | 12/1992 | Anick et al. | 715/835 |
| 5,519,862 | A | * | 5/1996 | Schaeffer et al. | 717/165 |
| 7,757,086 | B2 | * | 7/2010 | Walmsley | 713/171 |
| 7,818,741 | B1 | * | 10/2010 | Bourdev | 717/174 |
| 7,877,744 | B2 | * | 1/2011 | Jacobs et al. | 717/171 |
| 8,291,408 | B1 | * | 10/2012 | Czymontek | 717/178 |
| 8,527,943 | B1 | * | 9/2013 | Chiluvuri | 717/107 |
| 2006/0048132 | A1 | * | 3/2006 | Chen et al. | 717/168 |
| 2006/0143135 | A1 | * | 6/2006 | Tucker et al. | 705/59 |
| 2006/0232662 | A1 | | 10/2006 | Otaka et al. | |
| 2007/0006150 | A9 | * | 1/2007 | Walmsley | 717/120 |
| 2008/0010361 | A1 | * | 1/2008 | Jacobs et al. | 709/218 |
| 2008/0040701 | A1 | * | 2/2008 | Stern | 717/100 |
| 2008/0144936 | A1 | * | 6/2008 | Nishikawa | 382/177 |
| 2008/0313596 | A1 | * | 12/2008 | Kreamer et al. | 717/101 |
| 2009/0034723 | A1 | * | 2/2009 | Yanazume | 380/54 |
| 2009/0150831 | A1 | * | 6/2009 | Young et al. | 715/845 |
| 2009/0150889 | A1 | | 6/2009 | Yamaguchi et al. | |

(Continued)

FOREIGN PATENT DOCUMENTS

JP    07219876 A    8/1995

OTHER PUBLICATIONS

TheyCallMeTime; LabView Idea Exchange; Add a QR Code (2D Bar Code) Option to NI Product Activation Dialog; http://forums.ni.com/t5/LabVIEW-Idea-Exchange/Add-a-QR-Code-2D-Bar-Code-Option-To-NI-Product-Activation-Dialog/idi-p/1428900; Jan. 26, 2011.

*Primary Examiner* — Chameli Das
(74) *Attorney, Agent, or Firm* — ALG Intellectual Property, LLC (57) ABSTRACT

A computer-implemented method for facilitating access to shared resources within computer clusters may include identifying a quick response code captured by at least one computing system. The method may also include identifying information encoded in the quick response code captured by the computing system. The method may further include determining that the information encoded in the quick response code contains an activation key that facilitates activation of a software application. The method may additionally include applying, in response to this determination, the activation key to the software application in order to activate the software application without requiring a user of the software application to manually enter the activation key. Various other methods, systems, and computer-readable media are also disclosed.

20 Claims, 6 Drawing Sheets

(56) References Cited

U.S. PATENT DOCUMENTS

| | | |
|---|---|---|
| 2010/0163613 A1 | 7/2010 | Bucher et al. |
| 2011/0010704 A1 | 1/2011 | Jeon et al. |
| 2011/0066658 A1* | 3/2011 | Rhoads et al. ............. 707/803 |
| 2011/0246370 A1* | 10/2011 | Wang et al. ................ 705/64 |
| 2011/0282725 A1* | 11/2011 | Chatterjee et al. ........ 705/14.24 |
| 2012/0252420 A1* | 10/2012 | Czaja et al. ............... 455/414.1 |
| 2013/0059598 A1* | 3/2013 | Miyagi et al. ............. 455/456.1 |
| 2013/0080995 A1* | 3/2013 | Raza ............................ 717/107 |
| 2013/0093773 A1* | 4/2013 | DeRoller et al. ............. 345/467 |
| 2013/0219295 A1* | 8/2013 | Feldman et al. ............. 715/751 |

* cited by examiner

SYSTEMS AND METHODS FOR USING QUICK RESPONSE CODES TO ACTIVATE SOFTWARE APPLICATIONS

BACKGROUND

In today's world of vast computing technology, users of computing devices often download and install new software applications on a regular basis. For example, a user of a mobile computing device (such as a smartphone) may download and install tens or even hundreds of different software applications from one or more mobile software distribution platforms.

Many software applications require that a user manually enter a product activation key in order to activate one or more aspects of an application. For example, games, security software, and other similar applications may require that a user manually enter a legitimate product activation key prior to allowing the user to fully access or use the application in question.

Unfortunately, product activation keys can be inconvenient or even difficult to successfully manually enter due to their length (which may exceed 25 or more characters) and/or complexity, especially if users are required to manually enter such keys using compact and/or defective user interfaces (such as a compact and/or defective keyboard on a mobile device). As such, the instant disclosure identifies a need for systems and methods for quickly and conveniently activating software applications without requiring users to manually enter product activation keys.

SUMMARY

As will be described in greater detail below, the instant disclosure describes various exemplary systems and methods for using quick response codes (also known as "QR codes") to quickly and conveniently activate software applications, thereby obviating the inconveniences and/or difficulties often associated with manually entering such keys. In one example, a computer-implemented method for accomplishing such a task may include (1) identifying a QR code captured by at least one computing system, (2) identifying information encoded in the QR code captured by the computing system, (3) determining that the information encoded in the QR code contains an activation key (e.g., a string of one or more characters) that facilitates activation of a software application, and then (4) applying, in response to this determination, the activation key to the software application in question in order to activate the software application without requiring a user of the software application to manually enter the activation key.

The identified QR code may represent (1) a QR code generated in response to the user's purchase of the software application, (2) a pre-generated QR code distributed to the user in response to the user's purchase of the software application at a point-of-sale terminal, and/or (3) a pre-generated QR code distributed to the user within a physical package containing a computer-readable medium that includes the software application.

In some examples, the method may include identifying the QR code within a photographic image captured by a camera associated with the computing system. The method may also include automatically entering the application key into a user interface that requires the application key to activate the software application. The method may also include contacting a server associated with the software application to verify that the software application to be activated represents a licensed copy of the software application. In some examples, the method may further include applying the activation key to the software application to activate the software application on a different computing system.

In one embodiment, the method may include determining that the information encoded in the QR code contains a link that facilitates downloading the software application over a network. In this embodiment, the method may also include downloading the software application over the network and then installing the software application on the computing system. The method may also include applying the activation key to the software application immediately upon installing the software application on the computing system.

In one embodiment, a system for implementing the above-described method may include an identification module programmed to identify a QR code captured by at least one computing system and then identify information encoded in the QR code captured by the computing system. The system may also include an activation module programmed to determine that the information encoded in the QR code contains an activation key that facilitates activation of a software application and then apply, in response to this determination, the activation key to the software application in order to activate the software application without requiring a user of the software application to manually enter the activation key.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a QR code captured by at least one computing system, (2) identify information encoded in the QR code captured by the computing system, (3) determine that the information encoded in the QR code contains an activation key that facilitates activation of a software application, and then (4) apply, in response to this determination, the activation key to the software application in order to activate the software application without requiring a user of the software application to manually enter the activation key.

As will be explained in greater detail below, by using QR codes to automatically activate software applications, the various systems and methods described herein may enable users to quickly and conveniently activate such applications without having to manually enter product activation keys for the same. As such, these systems and methods may enable users to avoid the various inconveniences and/or difficulties that may be associated with manually entering such keys.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
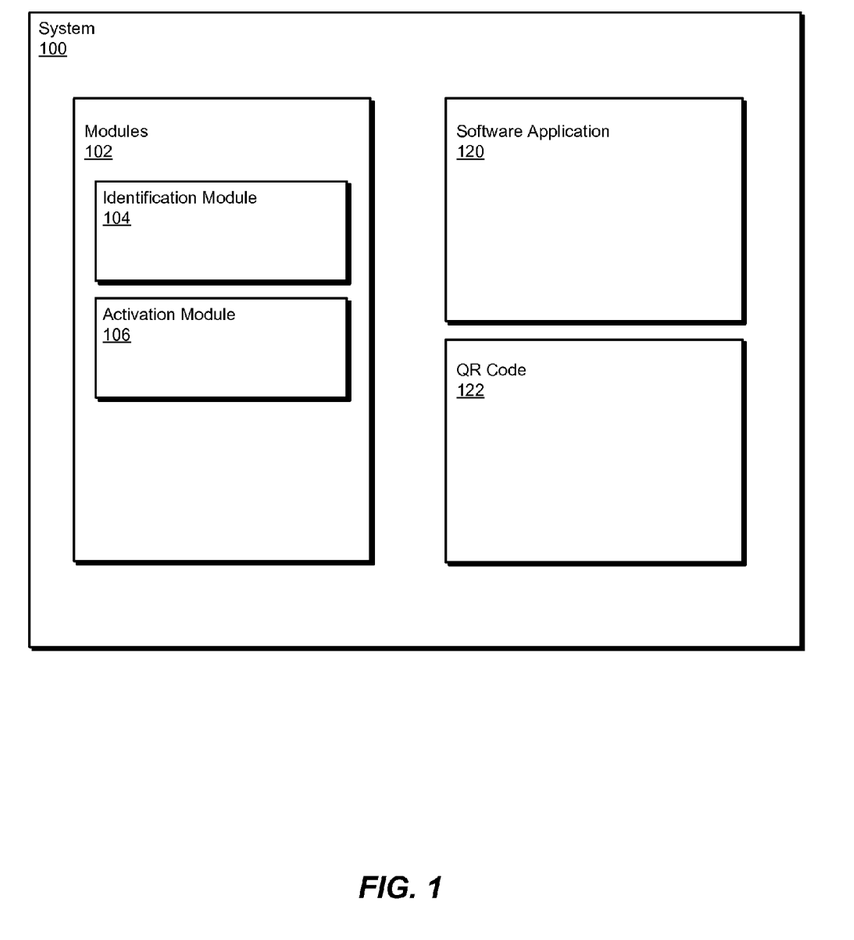
FIG. 1 is a block diagram of an exemplary system for using QR codes to activate software applications.
Figure 2:
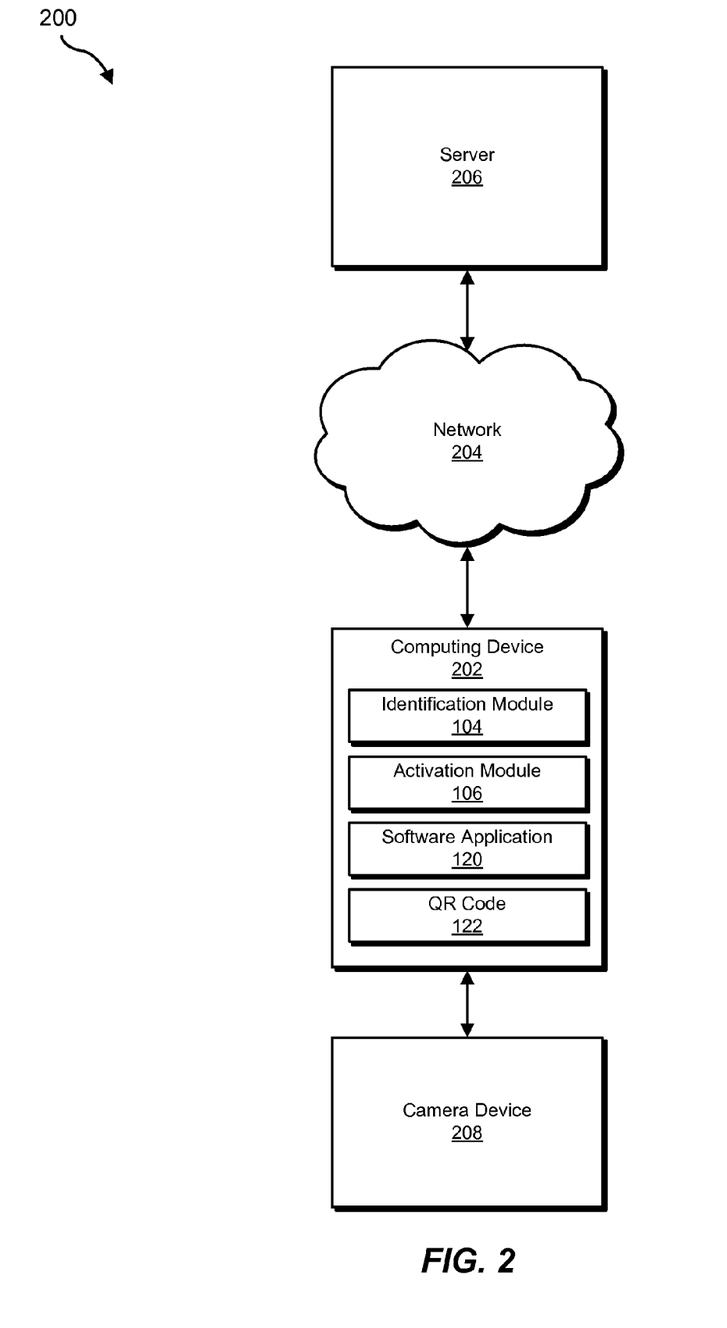
FIG. 2 is a block diagram of an exemplary system for using QR codes to activate software applications.

The following will provide, with reference to FIGS. 1-2, detailed descriptions of exemplary systems for using QR codes to activate software applications. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for using QR codes to activate software applications. As illustrated in this figure, exemplary system 100 may include one or more modules 102 for performing one or more tasks. For example, and as will be explained in greater detail below, exemplary system 100 may include an identification module 104 programmed to (1) identify a QR code captured by at least one computing system and then (2) identify information encoded in the QR code captured by the computing system.

In addition, and as will be described in greater detail below, exemplary system 100 may include an activation module 106 programmed to (1) determine that the information encoded in the QR code contains an activation key that facilitates activation of a software application and then (2) apply, in response to this determination, the activation key to the software application in order to activate the software application without requiring a user of the software application to manually enter the activation key. Although illustrated as separate elements, one or more of modules 102 in FIG. 1 may represent portions of a single module or application (such as a QR code scanner application).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

In some embodiments, exemplary system 100 may include one or more software applications, such as software application 120. In one example, software application 120 may represent a software application that has been installed on a computing device (such as computing device 202 and/or server 206 in FIG. 2, computing system 510 in FIG. 5, and/or portions of exemplary network architecture 600 in FIG. 6). In this example, even though software application 120 has been installed on the computing device, software application 120 may be unable to execute until being activated by an activation key. Software application 120 may represent any type or form of software configured to perform one or more specific tasks when executed by the computing device.

In some embodiments, exemplary system 100 may also include one or more QR codes, such as QR code 122. In one example, QR code 122 may represent a QR code that has been captured by a computing device (such as computing device 202 and/or server 206 in FIG. 2, computing system 510 in FIG. 5, and/or portions of exemplary network architecture 600 in FIG. 6). In this example, QR code 122 may include various information capable of being used by the capturing computing device and/or one or more additional computing devices. QR code 122 may represent any type or form of two-dimensional code that includes information encoded as shapes or modules of a particular color arranged in a rectangular pattern (such as a square pattern) on a background of a different color.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. System 200 may also include a camera device 208 accessible to computing device 202.

In one embodiment, one or more of modules 102 from FIG. 1 may, when executed by at least one processor of computing device 202, enable computing device 202 to use QR codes to activate software applications. For example, and as will be described in greater detail below, one or more of modules 102 may cause computing device 202 to (1) identify QR code 122, (2) identify information encoded in QR code 122, (3) determine that the information encoded in QR code 122 contains an activation key that facilitates activation of software application 120, and then (4) apply, in response to this determination, the activation key to software application 120 in order to activate software application 120 without requiring a user of software application 120 to manually enter the activation key.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, and/or any other suitable computing devices.

Camera device 208 generally represents any type or form of camera device capable of capturing, recording, and/or storing images (such as still photographs and/or video segments). In one example, camera device 208 may represent a stand-alone camera device capable of being accessed by computing device 202. In another example, camera device 208 may represent an internal camera device integrated into computing device 202. Examples of camera device 208 include, without limitation, camera phones, digital cameras, remote cameras, internet protocol cameras, movie cameras, pinhole cameras, pocket cameras, rangefinder cameras, single-lens reflex cameras, twin-lens reflex cameras, toy cameras, web cameras, video cameras, and/or any other suitable camera devices.

Server 206 generally represents any type or form of computing device capable of communicating with one or more additional computing devices and/or verifying the legitimacy of software applications installed on such additional computing devices. Examples of server 206 include, without limitation, application servers, web servers, and database servers configured to provide various web and/or database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
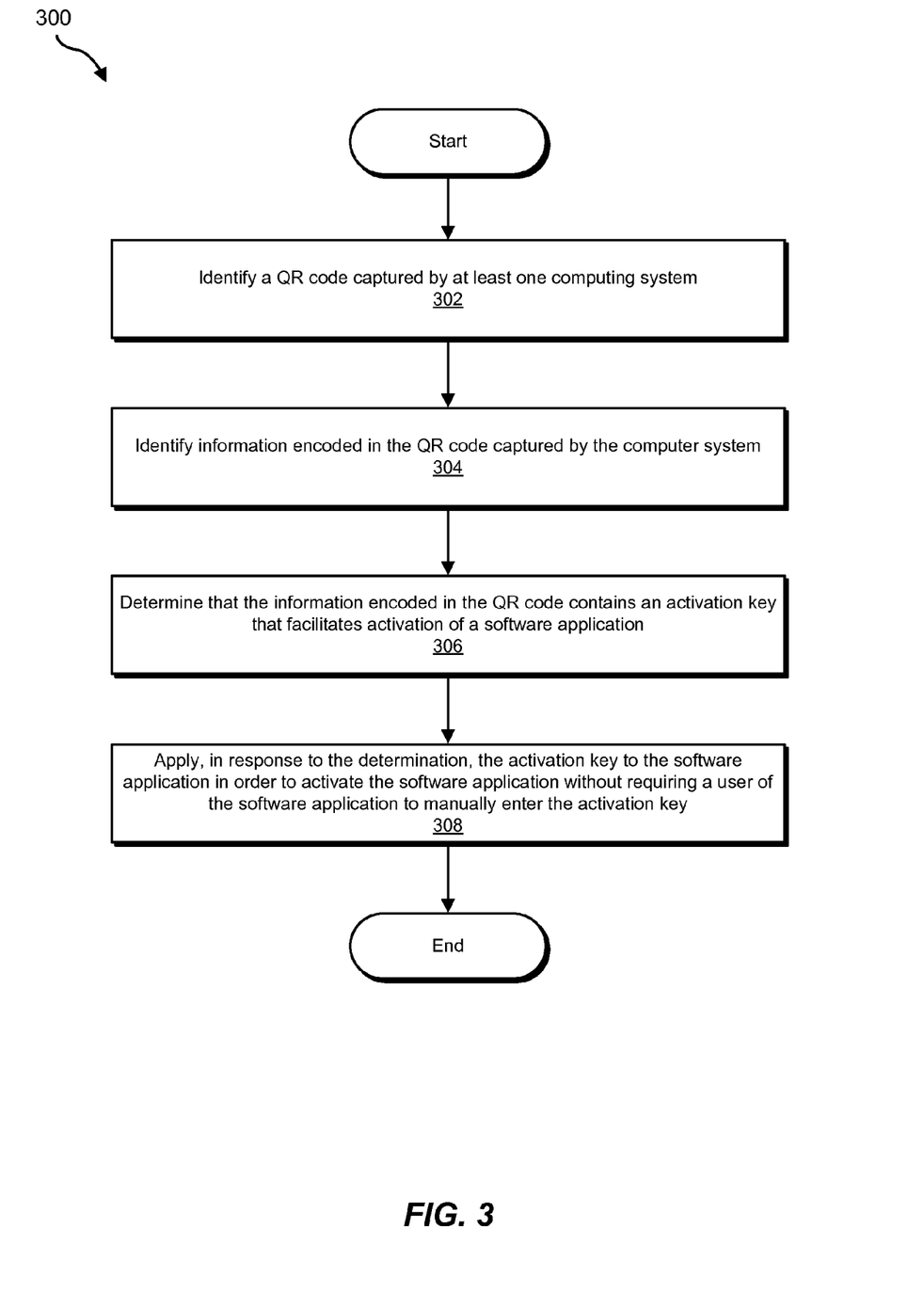
FIG. 3 is a flow diagram of an exemplary method for using QR codes to activate software applications.

FIG. 3 is a flow diagram of an exemplary computer-implemented method 300 for using QR codes to activate software applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 the various systems described herein may identify a QR code captured by at least one computing system. For example, identification module 104 may, as part of computing device 202, identify QR code 122 captured by computing device 202. In this example, QR code 122 may include various data and/or information capable of being processed and/or used by computing device 202.

The systems described herein may perform step 302 in a variety of ways. In one example, a user of computing device 202 may initiate execution of a QR code scanner application (which may include identification module 104 and/or activation module 106) configured to scan images (such as still photographs and/or video segments) captured by camera device 208 to determine whether such images include any QR codes. For example, the QR code scanner application may cause camera device 208 to capture an image of something visually accessible to a camera lens associated with camera device 208. In this example, after camera device 208 has captured the image, identification module 104 may analyze the image and then identify QR code 122 within the image during this analysis. This image captured by camera device 208 may represent any type of form of image, including a still photograph and/or video segment.

In another example, computing device 202 may receive an image from a different computing device (such as server 206 or another computing device that is not illustrated in FIG. 2). In this example, after computing device 202 has received the image, identification module 104 may analyze the image and then identify QR code 122 within the image during this analysis. This image received from the different computing device may represent any type of form of image, including a still photograph and/or video segment captured by a camera device associated with the different computing device.

Figure 4:
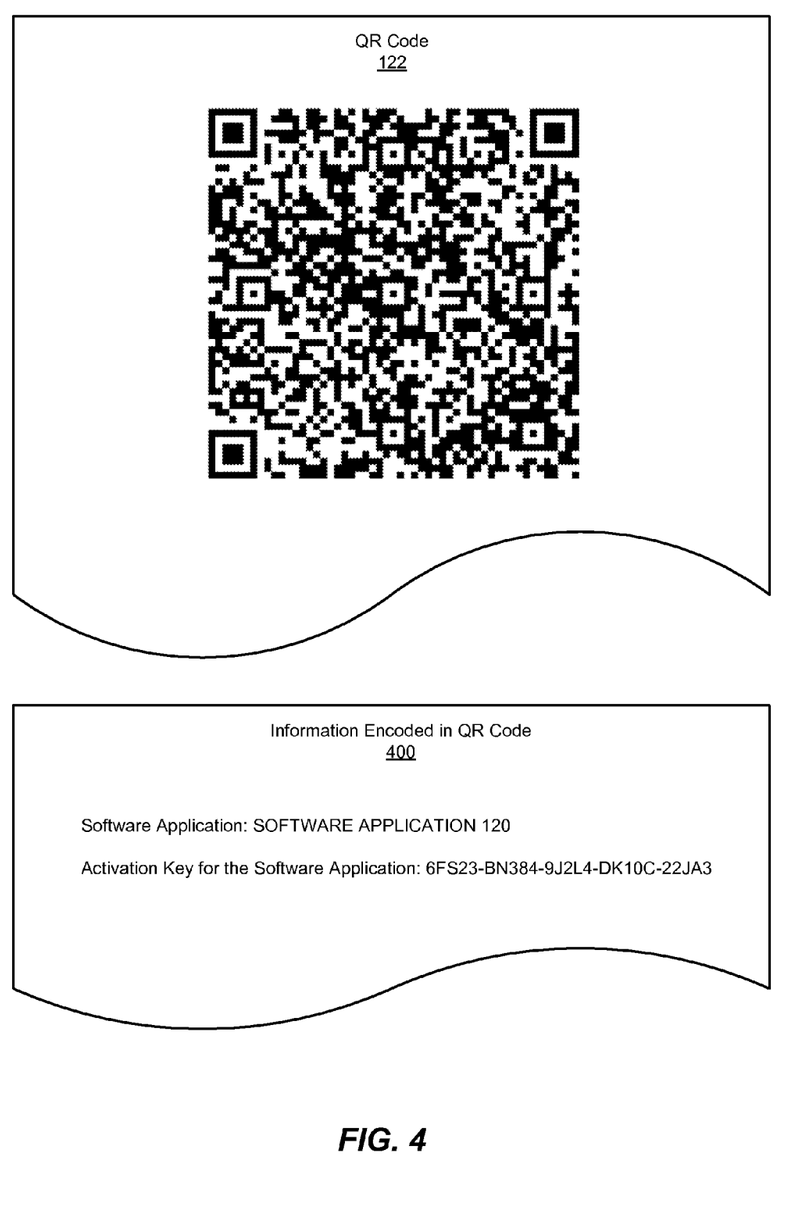
FIG. 4 is an illustration of an exemplary QR code and exemplary information encoded in such a QR code.

As illustrated in FIG. 4, QR code 122 may include various black modules arranged in a square pattern on a white background. This arrangement of black modules and white background may represent data and/or information capable of being processed and/or used by computing device 202. Examples of such data and/or information represented by QR code 122 include, without limitation, numeric information, alphabetic information, alphanumeric information, binary information, special-character information, kanji information, and/or any other suitable information.

In some examples, QR code 122 may be generated at a point in time that the user of computing device 202 purchases software application 120. In one example, the user of computing device 202 may purchase software application 120 at a physical shopping center (such as BEST BUY, WALMART, or COMPUSA). For example, the user of computing device 202 may pick up a physical package containing a computer-readable medium that includes software application 120 and then pay for the physical package at a point-of-sale terminal (such as a cash register or checkout counter) located within the physical shopping center.

As the user of computing device 202 pays for the physical package, a cashier operating the point-of-sale terminal may prompt the point-of-sale terminal to generate QR code 122 and print off a physical copy of QR code 122 (on, e.g., a card or receipt) in response to the user's purchase of software application 120. In this example, the cashier operating the point-of-sale terminal may give the printed physical copy of QR code 122 to the user of computing device 202 as part of the user's purchase. Upon receiving the printed physical copy of QR code 122 from the cashier, the user of computing device 202 may direct the camera lens associated with camera device 208 toward the printed physical copy and then cause camera device 208 to capture a photographic image of QR code 122.

In another example, the cashier operating the point-of-sale terminal may prompt the point-of-sale terminal to generate QR code 122 and provide QR code 122 for display on a user interface (such as a monitor) that is visibly accessible to the user of computing device 202 in response to the user's purchase of software application 120. In this example, while QR code 122 is displayed on the user interface, the user of computing device 202 may direct the camera lens associated with camera device 208 toward the user interface and then cause camera device 208 to capture a photographic image of QR code 122.

In a further example, the user of computing device 202 may purchase software application 120 from a website or webstore (such as AMAZON, APPLE'S APP STORE, or SYMANTEC'S online store) via the Internet. For example, the user of computing device 202 may add software application 120 to his or her online shopping cart and then pay for software application 120 at the website's or webstore's online checkout. In this example, the website or webstore may cause QR code 122 to be displayed on a user interface that is visibly accessible to the user of computing device 202 in response to the user's purchase of software application 120. While QR code 122 is displayed on the user interface, the user may direct the camera lens associated with camera device 208 toward the user interface and then cause camera device 208 to capture a photographic image of QR code 122.

In other examples, QR code 122 may be generated before the user of computing device 202 purchases software application 120. In one example, the cashier operating the point-of-sale terminal located within the physical shopping center may have access to a pre-generated card that includes QR code 122. In this example, as the user of computing device 202 pays for the physical package containing the computer-readable medium that includes software application 120, the cashier may give the pre-generated card that includes QR code 122 to the user in response to the user's purchase of software application 120. Upon receiving the pre-generated card that includes QR code 122 from the cashier, the user of computing device 202 may direct the camera lens associated with camera device 208 toward the pre-generated card and then cause camera device 208 to capture a photographic image of QR code 122.

In another example, while shopping at the physical shopping center, the user of computing device 202 may pick up a physical package containing (1) a computer-readable medium that includes software application 120 and (2) a pre-generated card that includes QR code 122. In this example, the user may pay for the physical package at the point-of-sale terminal located within the physical shopping center and later find the pre-generated card that includes QR code 122 within the physical package. Upon finding the pre-generated card that includes QR code 122 within the physical package, the user of computing device 202 may direct the camera lens associated with camera device 208 toward the pre-generated card and then cause camera device 208 to capture a photographic image of QR code 122.

In some examples, the user of computing device 202 may be prompted to use camera device 208 to capture a photographic image of QR code 122. For example, the user of computing device 202 may initiate installation of software application 120 on computing device 202. In this example, the installation process may cause computing device 202 to display a graphical prompt that instructs the user of computing device 202 to use camera device 208 to capture a photographic image of QR code 122. In response to this graphical prompt, the user of computing device 202 may direct the camera lens associated with camera device 208 toward a visual representation of QR code 122 (on, e.g., a card, receipt, poster, or user interface) and then cause camera device 208 to capture a photographic image of QR code 122.

In some embodiments, identification module 104 may identify QR code 122 before software application 120 has been installed on computing device 202. In other embodiments, identification module 104 may identify QR code 122 after software application 120 has been installed but before software application 120 has been activated on computing device 202.

Returning to FIG. 3, at step 304 the various systems described herein may identify information encoded in the QR code captured by the computing system. For example, identification module 104 may, as part of computing device 202, identify information 400 in FIG. 4 encoded in QR code 122 captured by computing device 202. In this example, information 400 encoded in QR code 122 may not be readily discernible and/or identifiable to the user of computing device 202 by simply looking at QR code 122.

The systems described herein may perform step 304 in a variety of ways. In one example, upon identifying QR code 122, identification module 104 may interpret QR code 122 to identify the information encoded in QR code 122. For example, identification module 104 may interpret QR code 122 by identifying the arrangement of black modules and white background included in QR code 122 and then decoding the arrangement of black modules and white background based on known decoding techniques. In this example, decoding the arrangement of black modules and white background, identification module 104 may identify information 400 encoded in QR code 122.

As illustrated in FIG. 4, exemplary information 400 encoded in QR code 122 may identify a software application (in this example, "SOFTWARE APPLICATION 120") and an activation key that facilitates activation of this software application (in this example, "6F523-BN384-9J2L4-DK10C-22JA3"). Although not necessarily illustrated in exemplary information 400, the activation key may include any type, form, or combination of numeric information, alphabetic information, binary information, special-character information, kanji information, and/or any other suitable information.

Returning to FIG. 3, at step 306 the various systems described herein may determine that the information encoded in the QR code contains the activation key that facilitates activation of the software application. For example, activation module 106 may, as part of computing device 202, determine that information 400 encoded in QR code 122 contains an activation key that facilitates activation of software application 120. As will be described in greater detail below, the activation key contained in information 400 may facilitate activation of software application 120 without requiring the user of software application 120 to manually enter the activation key.

The systems described herein may perform step 306 in a variety of ways. In one example, activation module 106 may search information 400 encoded in QR code 122 for a label or marker that identifies an activation key. For example, while searching information 400 encoded in QR code 122, activation module 106 may find the "Activation Key for the Software Application" label provided in connection with the "6F523-BN384-9J2L4-DK10C-22JA3" string. In this example, upon finding the "Activation Key for the Software Application" label provided in connection with the "6F523-BN384-9J2L4-DK10C-22JA3" string, activation module 106 may determine that this label indicates that the "6F523-BN384-9J2L4-DK10C-22JA3" string represents an activation key.

In another example, activation module 106 may search information 400 encoded in QR code 122 for a particular format of characters that is generally indicative of an activation key. For example, activation module 106 may compare information 400 encoded in QR code 122 with a generic template of "☐☐☐☐☐-☐☐☐☐☐-☐☐☐☐☐-☐☐☐☐☐-☐☐☐☐☐" (where each "☐" character represents any type or form of alphanumeric character) to determine whether information 400 contains an activation key. In this example, upon comparing information 400 with the "☐☐☐☐☐-☐☐☐☐☐-☐☐☐☐☐-☐☐☐☐☐-☐☐☐☐☐" generic template, activation module 106 may determine that (1) the "6FS23-BN384-9J2L4-DK10C-22JA3" string identified in information 400 matches (or satisfies) the generic template and (2) this match of the generic template and the "6FS23-BN384-9J2L4-DK10C-22JA3" string indicates that the "6FS23-BN384-9J2L4-DK10C-22JA3" string represents an activation key.

Upon determining that the "6FS23-BN384-9J2L4-DK10C-22JA3" string represents an activation key, activation module 106 may search information 400 encoded in QR code 122 for a label or marker that identifies the software application to be activated by the activation key. For example, while searching information 400 encoded in QR code 122, activation module 106 may find the "Software Application" label provided in connection with the "SOFTWARE APPLICATION 120" string. In this example, upon finding the "Software Application" label provided in connection with the "SOFTWARE APPLICATION 120" string, activation module 106 may determine that this label indicates that the activation key facilitates activation of software application 120.

Returning to FIG. 3, at step 308 the various systems described herein may apply the activation key to the software application in order to activate the software application without requiring the user of the software application to manually enter the activation key. For example, activation module 106 may, as part of computing device 202, apply the activation key to software application 120 in order to activate software application 120 without requiring the user to manually enter the activation key. In this example, successful completion of the activation process may enable computing device 202 to execute software application 120. In contrast, failure to successfully complete the activation process may prevent computing device 202 from executing software application 120 even though software application 120 has been installed on computing device 202.

The systems described herein may perform step 308 in a variety of ways. In one example, upon identifying the activation key that facilitates activation of software application 120, activation module 106 may automatically enter the activation key into a graphical user interface that requires the activation key to activate software application 120. For example, the activation process may cause computing device 202 to display a graphical user interface that includes a text box configured to accept the activation key to activate software activation 120. In this example, upon determining that the "6FS23-BN384-9J2L4-DK10C-22JA3" string represents the activation key that facilitates activation of software application 120, activation module 106 may automatically enter the "6FS23-BN384-9J2L4-DK10C-22JA3" string into the text box included in the graphical user interface to activate software application 120 on computing device 202.

In one example, activation module 106 may contact server 206 to verify that the copy of software application 120 to be activated on computing device 202 is a licensed copy of software application 120. For example, activation module 106 may transmit the "6FS23-BN384-9J2L4-DK10C-22JA3" string that represents the activation key to server 206. In this example, in response to receiving the "6FS23-BN384-9J2L4-DK10C-22JA3" string from activation module 106, server 206 may verify that (1) the "6FS23-BN384-9J2L4-DK10C-22JA3" string represents a legitimate activation key and (2) the "6FS23-BN384-9J2L4-DK10C-22JA3" string has not already been used to activate software application 120 on a different computing device.

In such an example, upon completion of this verification process, server 206 may notify activation module 106 that the copy of software application 120 to be activated on computing device 202 is a licensed copy of software application 120. In response to receiving this notification from server 206, activation module 106 may complete the activation process to enable computing device 202 to execute software application 120.

In one example, although not illustrated in exemplary information 400 in FIG. 4, the information encoded in QR code 122 may also contain a link that facilitates downloading software application 120 over a network (such as the Internet). For example, prior to downloading or installing software application 120 on computing device 202, activation module 106 may analyze the information encoded in QR code 122 and determine, based on this analysis, that the information also contains a link (such as a URL) to a website that hosts a downloadable copy of software application 120. In response to this determination, activation module 106 may cause computing device 202 to (1) access the website over the Internet, (2) download software application 120 from the website, and then (3) install software application 120 upon completion of the download. Activation module 106 may then apply the activation key to software application 120 immediately upon installing software application 120 on computing device 202 to activate software application 120.

In one example, the user of computing device 202 may also attempt to activate a copy of software application 120 installed on a different computing device by using camera device 208 to capture a photographic image of QR code 122. For example, the user of computing device 202 may connect computing device 202 to a desktop computer that includes an inactivated copy of software application 120. In this example, the user of computing device 202 may direct the camera lens associated with camera device 208 toward a visual representation of QR code 122 (on, e.g., a card, receipt, poster, or user interface) and then cause camera device 208 to capture a photographic image of QR code 122.

In response to this capture of the photographic image of QR code 122, activation module 106 may analyze QR code 122 and determine that the information encoded in QR code 122 contains an activation key that facilitates activation of the inactivated copy of software application 120 installed on the desktop computer. Upon determining that the information encoded in QR code 122 contains the activation key, activation module 106 may transmit the activation key to the desktop computer to be automatically applied to the inactivated copy of software application 120 installed on the desktop computer in order to activate the inactivated copy of software application 120 without requiring a user of the desktop computer to manually enter the activation key.

As explained above, by using QR codes to automatically activate software applications, the various systems and methods described herein may enable users to quickly and conveniently activate such applications without having to manually enter product activation keys for the same. As such, these systems and methods may enable users to avoid the various inconveniences and/or difficulties that may be associated with manually entering such keys.

Figure 5:
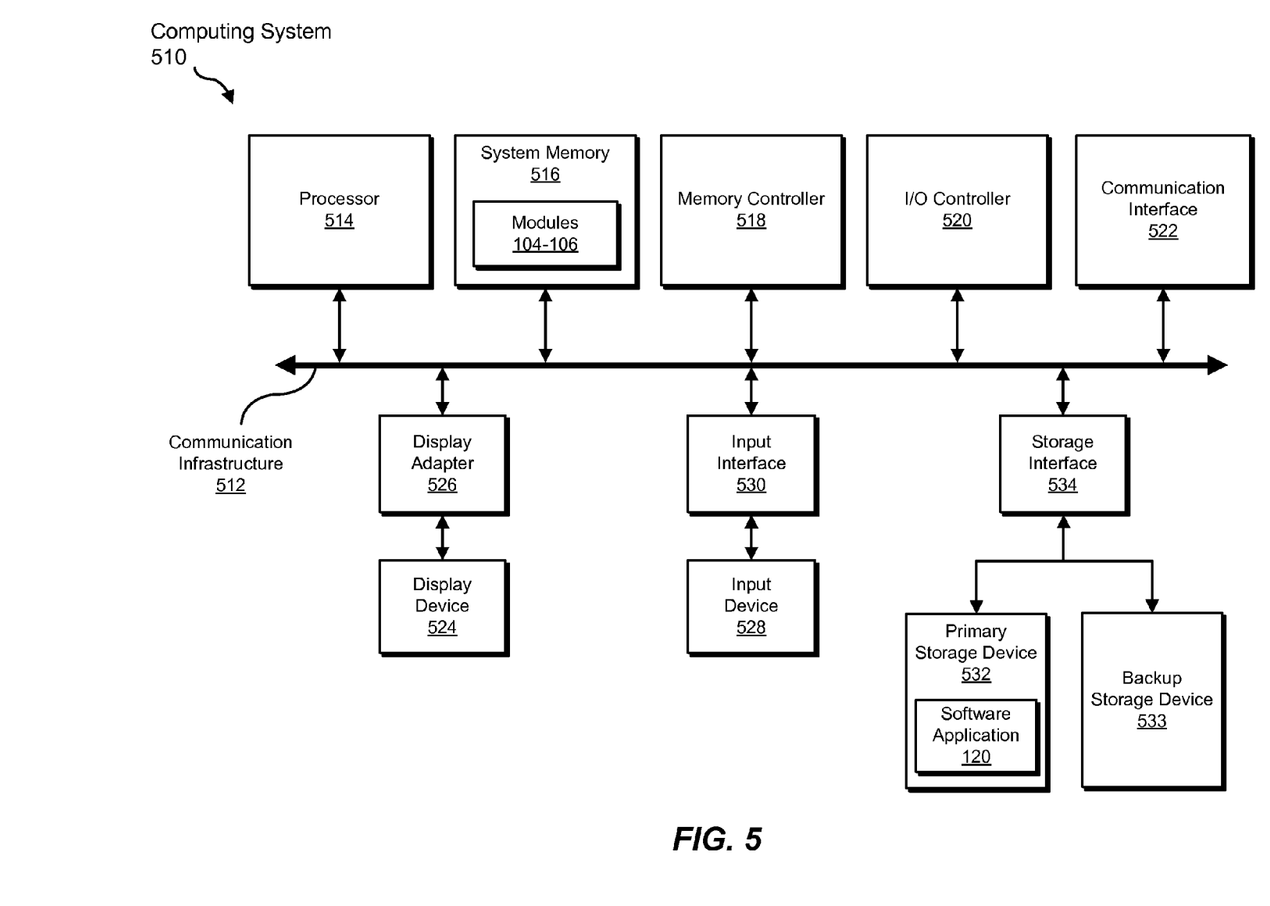
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, applying, activating, automatically entering, contacting, verifying, downloading, and installing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, software application 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
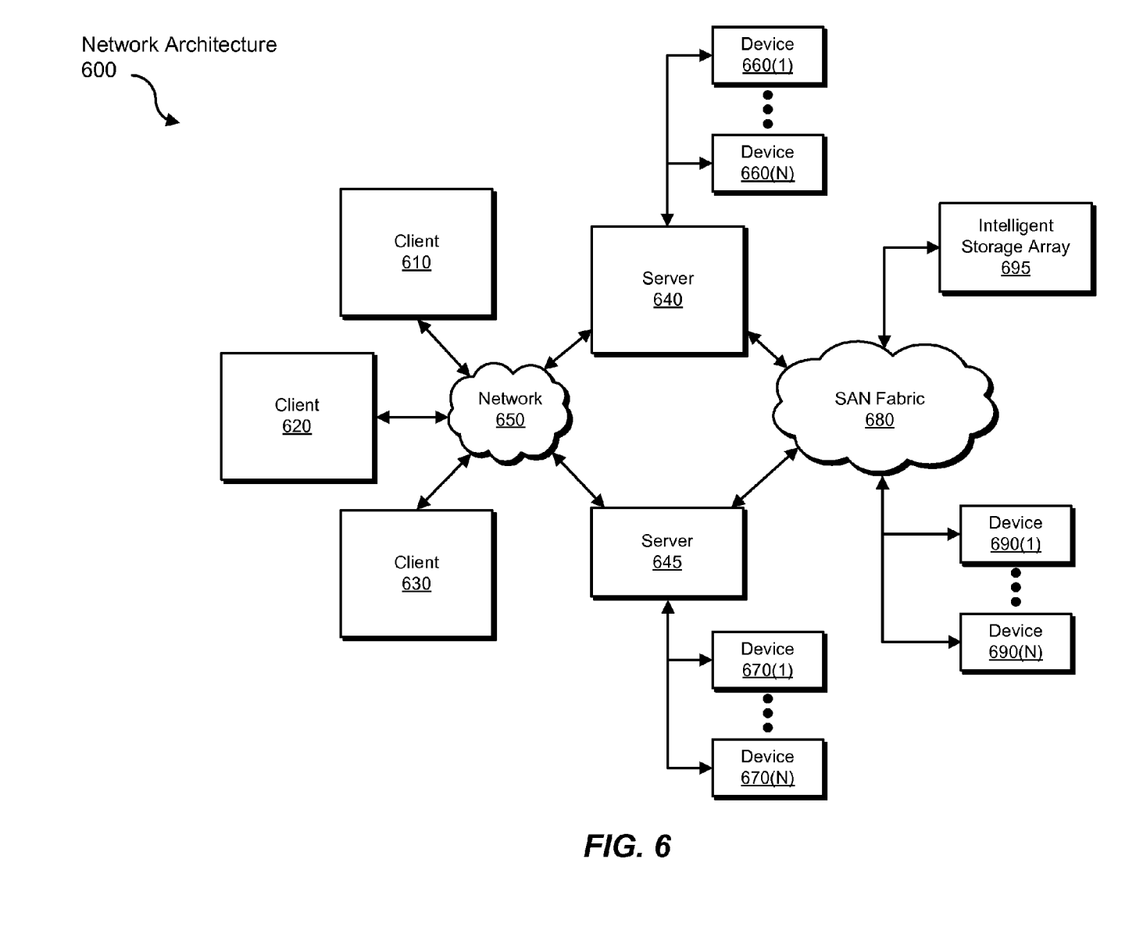
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, applying, activating, automatically entering, contacting, verifying, downloading, and installing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for using quick response codes to activate software applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a characteristic or property of one or more physical devices (such as computing device 202 and/or server 206 in FIG. 2) by using a QR code to activate a software application without requiring a user of the software application to manually enter an activation key associated with the software application.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using quick response codes to activate software applications, at least a portion of the method being performed by a computing device comprising at least one processor, the method comprising:
   identifying a two-dimensional quick response code captured by at least one computing system;
   identifying information encoded in the two-dimensional quick response code captured by the computing system;
   determining that the information encoded in the two-dimensional quick response code contains an activation key that facilitates activation of an inactivated copy of a software application;
   in response to determining that the information encoded in the two-dimensional quick response code contains the activation key, applying the activation key to the inactivated copy of the software application in order to activate the inactivated copy of the software application without requiring a user of the software application to manually enter the activation key;
   wherein the activation key comprises a string of one or more characters used to activate the inactivated copy of the software application.

2. The method of claim 1, wherein identifying the two-dimensional quick response code captured by the computing system comprises identifying the two-dimensional quick response code within a photographic image captured by a camera associated with the computing system.

3. The method of claim 1, wherein identifying the two-dimensional quick response code captured by the computing system comprises identifying a two-dimensional quick response code generated in response to the user's purchase of the inactivated copy of the software application.

4. The method of claim 1, wherein identifying the two-dimensional quick response code captured by the computing system comprises identifying a pre-generated two-dimensional quick response code distributed to the user in response to the user's purchase of the inactivated copy of the software application at a point-of-sale terminal.

5. The method of claim 1, wherein identifying the two-dimensional quick response code captured by the computing system comprises identifying a pre-generated two-dimensional quick response code distributed to the user within a physical package containing a computer-readable medium that includes the inactivated copy of the software application.

6. The method of claim 1, wherein applying the activation key to the inactivated copy of the software application in order to activate the inactivated copy of the software application comprises automatically entering the activation application key into a user interface that requires the activation application key to activate the inactivated copy of the software application.

7. The method of claim 1, wherein applying the activation key to the inactivated copy of the software application in order to activate the inactivated copy of the software application comprises contacting a server associated with the software application to verify that the inactivated copy of the software application to be activated represents a licensed copy of the software application.

8. The method of claim 1, wherein applying the activation key to the inactivated copy of the software application comprises applying the activation key to the inactivated copy of the software application to activate the software application on a different computing system.

9. The method of claim 1, wherein determining that the information encoded in the two-dimensional quick response code contains the activation key comprises:
   determining that the information encoded in the two-dimensional quick response code also contains a link that facilitates downloading the inactivated copy of the software application over a network;
   in response to determining that the information encoded in the two-dimensional quick response code also contains the link:
   downloading the inactivated copy of the software application over the network;
   installing the inactivated copy of the software application on the computing system.

10. The method of claim 9, wherein applying the activation key to the inactivated copy of the software application in order to activate the software application comprises applying the activation key to the inactivated copy of the software application immediately upon installing the inactivated copy of the software application on the computing system.

11. The method of claim 9, wherein the link that facilitates downloading the inactivated copy of the software application over the network comprises a link to a product registration form for the software application.

12. The method of claim 1, wherein the inactivated copy of the software application is unable to execute prior to being activated by at least one activation key.

13. The method of claim 1, wherein the two-dimensional quick response code includes information encoded as shapes or modules arranged in a rectangular pattern on a background of a different color.

14. A system for using quick response codes to activate software applications, the system comprising:
  an identification module programmed to:
  identify a two-dimensional quick response code captured by at least one computing system;
  identify information encoded in the two-dimensional quick response code captured by the computing system;
  an activation module programmed to:
  determine that the information encoded in the two-dimensional quick response code contains an activation key that facilitates activation of an inactivated copy of a software application;
  apply, in response to determining that the information encoded in the two-dimensional quick response code contains the activation key, the activation key to the inactivated copy of the software application in order to activate the inactivated copy of the software application without requiring a user of the software application to manually enter the activation key;
  wherein the activation key comprises a string of one or more characters used to activate the inactivated copy of the software application;
  at least one processor configured to execute the identification module and the activation module.

15. The system of claim 14, wherein the identification module is programmed to identify the two-dimensional quick response code within a photographic image captured by a camera associated with the computing system.

16. The system of claim 14, wherein the identification module is programmed to identify a two-dimensional quick response code generated in response to the user's purchase of the inactivated copy of the software application.

17. The system of claim 14, wherein the identification module is programmed to identify a pre-generated two-dimensional quick response code distributed to the user in response to the user's purchase of the inactivated copy of the software application at a point-of-sale terminal.

18. The system of claim 14, wherein the identification module is programmed to identify a pre-generated two-dimensional quick response code distributed to the user within a physical package containing a computer-readable medium that includes the inactivated copy of the software application.

19. The system of claim 14, wherein the activation module is programmed to automatically enter the activation application key into a user interface that requires the activation application key to activate the inactivated copy of the software application.

20. A non-transitory computer-readable-storage medium comprising one or more computer-executable instructions that, when executed by at least one processor of a computing device, cause the computing device to:
  identify a two-dimensional quick response code captured by at least one computing system;
  identify information encoded in the two-dimensional quick response code captured by the computing system;
  determine that the information encoded in the two-dimensional quick response code contains an activation key that facilitates activation of an inactivated copy of a software application;
  apply, in response to determining that the information encoded in the two-dimensional quick response code contains the activation key, the activation key to the inactivated copy of the software application in order to activate the inactivated copy of the software application without requiring a user of the software application to manually enter the activation key,
  wherein the activation key comprises a string of one or more characters used to activate the inactivated copy of the software application.

* * * * *

UNITED STATES PATENT AND TRADEMARK OFFICE
CERTIFICATE OF CORRECTION

| | | |
|---|---|---|
| PATENT NO. | : 8,914,767 B2 | Page 1 of 1 |
| APPLICATION NO. | : 13/418336 | |
| DATED | : December 16, 2014 | |
| INVENTOR(S) | : Gaurav Chandna, Garret Polk and Anubhav Savant | |

It is certified that error appears in the above-identified patent and that said Letters Patent is hereby corrected as shown below:

On the Title Page, at (12), the Inventors should read:

Chandna et al.

On the Title Page, at (75), the Inventors should read:

Gaurav Chandna, Redondo Beach, CA (US); Garret Polk, Northridge, CA (US); Anubhav Savant, Culver City, CA (US)

In the Claims

Claim 20, at column 18, line 32, should read:

manually enter the activation key;

Signed and Sealed this
Ninth Day of June, 2015

Michelle K. Lee
*Director of the United States Patent and Trademark Office*